Jan. 21, 1964  R. L. COOK  3,118,960
METHOD OF FORMING STRETCHED PLASTIC
Filed April 27, 1961

INVENTOR.
RICHARD L. COOK
BY
ATTORNEY

United States Patent Office 3,118,960
Patented Jan. 21, 1964

3,118,960
METHOD OF FORMING STRETCHED PLASTIC
Richard L. Cook, Phoenix, Ariz., assignor to Goodyear Aerospace Corporation, a corporation of Delaware
Filed Apr. 27, 1961, Ser. No. 106,013
5 Claims. (Cl. 264—230)

This invention relates to improved methods for forming stretched plastics having "plastic memory," namely, plastics tending to return to their original unstretched condition when subjected to forming temperatures.

It has been the usual practice heretofore to form stretched plastics having "plastic memory" by heating the plastic to a temperature somewhat below the temperature at which it has been streched, followed by forming of the plastic under pressure against an overdeveloped mold so that upon cooling the plastic will spring back to the shape in which it is desired to have it molded. However, the exact amount of spring-back is difficult to control, and when the spring-back is not correct it has been necessary to change the amount of overdevelopment of the mold and this is a relatively expensive procedure involving remachining to take metal away from the mold, or a process for adding metal to the mold, this latter process sometimes requiring an entirely new mold.

It is the general object of the present invention to avoid and overcome the foregoing and other difficulties of and objections to prior art practices by the provision of an improved simplified method for forming stretched plastic material against a mold which is not overdeveloped, but which is of the shape to which the piece is to be molded, the process involving differential heating of the stretched plastic material itself so as to eliminate spring-back.

Another object of the invention is to provide an improved method for shaping stretched plastic by differential heating applied to the plastic to effect controlled contouring of the plastic.

Another object of the invention is to provide a method of forming stretched plastic by differential heating applied to opposite sides thereof, the process including pressing at least one side of the material against the mold during at least a portion of the time that heat in different amounts is applied to opposite sides of the stretched plastic.

Another object of the invention is to provide a process for operations upon plastics having "plastic memory" and including the steps of heating the plastic, stretching the plastic to flat sheet form, cooling the plastic, and thereafter performing the methods set forth in the preceding objects.

Figure 1:
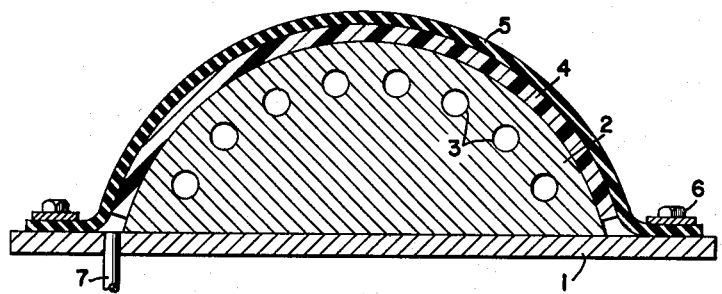
Figure 2:
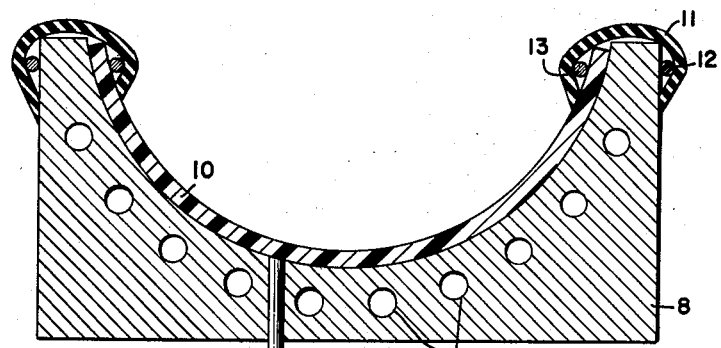
Figure 3:
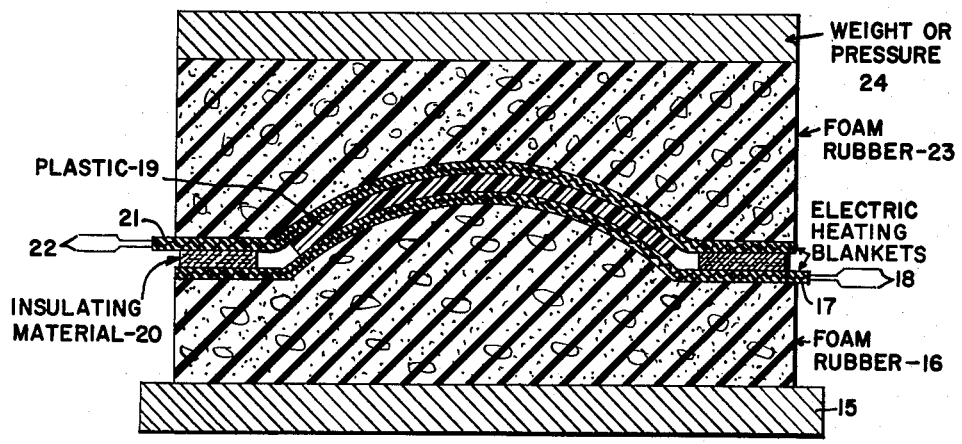

For a better understanding of the invention reference should be had to the accompanying drawings wherein FIG. 1 is a vertical cross-sectional view through a male molding apparatus adapted to perform the operation of the invention;

FIG. 2 is a view similar to FIG. 1 but of female molding apparatus for performing the method of the invention; and FIG. 3 is a view similar to FIGS. 1 and 2 but illustrating apparatus in which the stretched plastic sheet material is allowed to substantially float as differential heat is applied to opposite sides thereof.

Having specific reference to the drawings, the numeral 1 indicates a metal plate upon which is mounted a male mold 2, usually of compoundly curved shape, the mold 2 being provided with some suitable means for controlling the temperature thereof. For example, the mold 2 may be formed with a plurality of openings 3 therethrough for the reception of a controlled temperature fluid whereby the temperature of the mold can be controlled within relatively accurate limits.

Applied against the surface of the mold 2 is a sheet of stretched plastic material 4 having a "plastic memory," this material being held down against or towards the mold 2 by means of rubber diaphragm or air bag 5 sealed at its edges against the plate 1 by a clamp ring 6, with a conduit 7 normally exhausting air from between diaphragm 5 and the plate 1 so that the plastic 4 is forced towards or against the mold 2 by atmospheric pressure.

In the operation of the apparatus of FIG. 1, the sheet of plastic 4, for example, methyl methacrylate, in original unstretched form is first heated and then stretched in any desired manner although this is usually a multi-axial stretching operation in which the sheet is gripped around its periphery and stretched, for example up to 100%, in all directions in a flat plane, with the sheet being cooled in its stretched flat position. Thereafter, the sheet may be cut into smaller sheets, one of such sheets will be reheated to a temperature below the temperature at which it was stretched, followed by the draping of the sheet 4 over the mold 2 and the placing of the diaphragm 5 over the sheet 4 and the securing of the clamp ring 6 in place and the application of vacuum to the conduit 7. Usually the mold 2 is coated wtih a grease or a sprayed on film so that a non-solid intermediate layer is provided between the mold and the sheet to prevent mark off or surface marring of the sheet against the mold.

Now the mold 2 is heated to a controlled temperature, for example 250 degrees Fahrenheit and the temperature outside of the diaphragm 5 is controlled to an exact temperature, as by placing the mold assembly in an oven, for example to a temperature of 200 degrees Fahrenheit for a selected period of time, usually from about five to about twenty-five minutes, and then the entire mold assembly and plastic 4 is cooled and the assembly is dismantled and the formed plastic 4 is removed.

By properly compensating the heat differential between the mold 2 and the air outside of the mold assembly wtih the forming time plastic formed pieces are produced to the contour of the mold and having substantially no spring-back. Should the plastic piece 4 as formed tend to spring more open after it is removed from the mold the heat differential between the mold 2 and the outside air is increased so that the formed plastic piece tends to hug the mold 2 more tightly with more shrinkage of the plastic occurring upon the inner or concave face thereof. On the other hand, if when the plastic piece 4 is removed from the mold 2 it tends to spring inwardly into more of a concave shape, then the differential between the mold 2 and the air outside of the mold assembly during the molding operation is decreased.

Usually some cutting and trying is necessary in order to determine the best temperature differential and molding time for a given thickness of plastic stretched in a given amount and adapted to be molded in a specific mold. However, following the general rules stated and running a few test pieces will allow the man skilled in the art to practice the invention of the application and will allow him to produce molded parts with little or no spring-back and to the desired molded contour.

Turning now to the apparatus of FIG. 2 of the invention, this comprises a female mold 8 having a vacuum line 9 connected to the molding surface thereof, and with the mold removably receiving a sheet 10 of stretched plastic material, such as methyl methacrylate. Surrounding the upper edge of the mold 8 and the plastic sheet 10 is a rubber-like sealing gasket 11 having tapered edge portions adapted to engage in sealing relation with both the mold and the plastic sheet 10 in the manner illustrated. Rings of soft putty-like sealing material 12 and 13 can be positioned underneath the flanges of the gasket 11 if this is found helpful in effecting the sealing action of the gasket.

In the operation of the apparatus of FIG. 2, a plastic sheet is heated and then stretched, usually multi-axially into a flat sheet and is cooled. Thereafter the sheet is reheated to a temperature under the temperature at which it was stretched, and the sheet, such as the plastic sheet 10, is draped into the mold 8, which may be greased, and the gasket 11 is applied around the edges of the mold and plastic sheet and vacuum is applied to the conduit 9 to assist in shaping the sheet 10 to the contour of the mold 8. During the shaping operation the mold 8 is maintained at a temperature, for example between about 180 and about 205 degrees Fahrenheit, this temperature being different than the temperature maintained on the outside of the sheet 10. More specifically, the outside of the sheet 10 is maintained, for example, at a temperature of 250 degrees Fahrenheit, this being accomplished by putting the entire mold assembly in an oven during the forming operation.

Now, in the same manner as followed in the use of the apparatus of FIG. 1, by maintaining the proper temperature differential on the sheet 10, the sheet can be formed to the contour of the mold 8, the assembly cooled, and the plastic removed with little or no springback resulting. As a general rule, should the plastic 10 tend to spring away from the mold 8 upon cooling, particularly at the flange portions thereof, the temperature differential between the opposite sides of the plastic during forming is reduced. In other words, instead of maintaining an air temperature of 250 degrees on the outside of the plastic 10, this will be reduced so that the temperature is less than 250 degrees and is nearer to the 180 to 205 degree temperature maintained on the mold 8.

On the other hand, should the flanges of the formed plastic 10 tend to spring towards the mold 8 after the plastic piece has been cooled and its removal from the mold is initiated, then the temperature differential between the sides of the plastic piece during molding is increased. For example, the air temperature on the outside of the plastic piece may be increased above 250 degrees Fahrenheit.

In still another example of operations upon a piece of Plexiglas No. 55, this was stretched multi-axially approximately 100%, and had a thickness of 0.460 inch after stretching. A temperature of 130 degrees Fahrenheit was maintained on the mold, 250 degrees Fahrenheit was maintained on the outside air, and 230 degrees Fahrenheit was maintained on the air between the mold and the sheet for a period of approximately 10 minutes, together with approximately a 90% vacuum on the conduit 9 in order to effect the forming of a dishpan-shaped piece with the apparatus of FIG. 2. By this technic very thick panels can be formed to extreme contours without markoff. This is because as the sheet touches down on the relatively cool mold the heat of the sheet is dumped into the mold which acts as a heat sink, thus rapidly cooling the sheet and preventing mark off on the sheet.

Some cutting and trying may be necessary by the man skilled in the art, but with the overall guideposts set forth herein after a few trys the method may be employed successfully to achieve the objects of the invention.

FIG. 3 illustrates apparatus in which the differential temperature on opposite sides of a stretched plastic piece is employed to effect the shaping of the piece without the necessity to apply molding force. More specifically, in FIG. 3, the numeral 15 indicates a metal base plate supporting a block of foam rubber 16 or other similar resilient plastic material. Positioned on top of the block of foam rubber 16 is a flexible electric heating blanket 17 having electric leads 18 connected thereto so that the heating blanket can be energized to provide a selected temperature. The stretched plastic sheet 19, which may be greased, is positioned on top of the electric blanket 17 and a strip of insulating material 20 is positioned around the edge of the plastic sheet 19 and having a thickness substantially equal to the sheet.

Positioned on top of the plastic 19 is a second flexible electric heating blanket 21 having electric leads 22 whereby the exact temperature of the electric blanket can be controlled. On top of the electric blanket 21 is another block of foam rubber 23 or other similar resilient material, and on top of the complete sandwich assembly is a metal plate 24 merely serving to hold the assembly in relatively firm relationship.

Now in the operation of the apparatus of FIG. 3, it is possible to apply through the electric blankets 17 and 21 a desired heat differential to the plastic sheet 19, and to maintain this for a selected period of time. The rubber blankets themselves are relatively flexible so that as the plastic piece 19 recovers to a greater amount on one side than on the other the plastic piece is contoured to a concavo-convex shape, the exact contour being a function of the temperature differential on the opposite sides thereof and the time that this differential is maintained.

Again, by suitable trial and error the man skilled in the art can utilize the principles of the invention to shape flatly curved plastic articles to substantial duplication, remembering only that the greater the temperature differential and the longer this is maintained, the greater will be the curving of the plastic.

While a certain representative embodiment and details have been shown for the purpose of illustrating the invention, it will be apparent to those skilled in this art that various changes and modifications may be made therein without departing from the spirit or scope of the invention.

What is claimed is:

1. That method of forming plastic materials having "plastic memory" which includes the steps of heating a sheet-like body of said material, stretching the material, cooling the material in its stretched condition, reheating the material to a temperature under the temperature at which it was stretched, draping the material on a mold, applying pressure to one side of the material to assist in shaping the material to the contour of the mold and applying heat from different independently controllable sources and in different amounts to opposite sides of the material to effect a greater recovery of the original form of the material on one side thereof than on the other and in such differential amounts that upon cooling the material conforms to the mold contour without inward or outward springback.

2. That method of forming plastic materials having "plastic memory" which includes the steps of heating a sheet-like body of said material, stretching the material flat, cooling the flat material in its stretched condition, applying heat to one side of the cooled material, simultaneously applying heat to the opposite side of the cooled material, said second application of heat being in a different amount and from a different source than said first mentioned application of heat, and effecting a greater recovery of the original form of the material on one side thereof than on the other because of the difference in the amounts of heat applied to the sides to thereby curve the material in a desired amount.

3. That method of forming plastic materials having "plastic memory" which includes the steps of heating a sheet-like body of said material, stretching the material, cooling the material in its stretched condition, applying heat in selected different amounts and from different sources to opposite sides of the cooled material, maintaining the selected constant temperature difference in the heat applied on the opposite sides of the cooled material for the selected duration of the forming process thereby effecting a desired curvature of the material due to a greater recovery of the original form of the material on one side thereof than on the other, and pressing at least one side of the material against a mold during at least a portion of the time of the forming process.

4. That method of forming plastic materials having "plastic memory" which includes the steps of heating a sheet-like body of said material to a stretching temperature, stretching the material multi-axially and in a flat plane to between about 50% and 150% of its original dimensions, cooling the stretched material to solidify it, applying a flexible blanket-like heating means to one side of the cooled material, applying a second flexible blanket-like heating means to the other side of the cooled material, supplying one heating temperature to said one heating means, supplying a different heating temperature from said one heating temperature to said second heating means, and resiliently holding the heating means against the respective sides of the material but with a yielding force so that the material can move due to plastic memory to a concave-convex shape without separation from the heating means.

5. That method of forming plastic materials having "plastic memory" which includes the steps of heating a sheet-like body of said material to a stretching temperature, stretching the material multi-axially and in a flat plane, cooling the stretched material, applying a flexible blanket-like heating means to one side of the cooled material, applying a second flexible blanket-like heating means to the other side of the cooled material, adjustably supplying power to provide a heating temperature in said one blanket-like heating means, adjustably supplying power to provide a heating temperature in said second blanket-like heating means with said temperature of said second blanket-like heating means being lower than said temperature of said one blanket-like heating means, and resiliently holding the heating means against the respective sides of the material but with a yielding force so that the material can move to a concave-convex shape without separation from the heating means.

References Cited in the file of this patent
UNITED STATES PATENTS

| | | |
|---|---|---|
| 2,234,994 | Vernon et al. | Mar. 18, 1941 |
| 2,897,546 | Clapp et al. | Aug. 4, 1959 |
| 3,000,057 | Swedlow et al. | Sept. 19, 1961 |